(12) United States Patent
Lee et al.

(10) Patent No.: US 9,665,230 B2
(45) Date of Patent: May 30, 2017

(54) TOUCH DEVICE AND FABRICATION METHOD THEREOF

(71) Applicant: TPK Touch Solutions (Xiamen) Inc., Xiamen (CN)

(72) Inventors: Yuh-Wen Lee, Hsinchu (TW); Hsiang-Lung Hsia, Changhua (TW); Yanjun Xie, Wuhan (CN); Feng Chen, Xiamen (CN); Fengming Lin, Fuzhou (CN); Xianbin Xu, Xiamen (CN); Keming Ruan, Quanzhou (CN)

(73) Assignee: TPK Touch Solutions (XIAMEN) Inc., Xiamen (CN)

( * ) Notice: Subject to any disclaimer, the term of this patent is extended or adjusted under 35 U.S.C. 154(b) by 0 days.

(21) Appl. No.: 14/988,748

(22) Filed: Jan. 6, 2016

(65) Prior Publication Data

US 2016/0132157 A1    May 12, 2016

Related U.S. Application Data

(63) Continuation of application No. 13/450,486, filed on Apr. 19, 2012, now Pat. No. 9,262,022.

(30) Foreign Application Priority Data

Oct. 13, 2011   (CN) .......................... 2011 1 0317586

(51) Int. Cl.
*G06F 3/041*    (2006.01)
*G06F 3/044*    (2006.01)

(52) U.S. Cl.
CPC ............ G06F 3/044 (2013.01); G06F 3/0412 (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 5,869,790 A | * | 2/1999 | Shigetaka | ............. G06F 3/0414 178/18.01 |
| 7,986,092 B2 | * | 7/2011 | Kim | .................... H01L 27/3227 313/498 |
| 2011/0074279 A1 | * | 3/2011 | Klier | ...................... C08F 222/32 313/498 |
| 2011/0180798 A1 | * | 7/2011 | Shim | .................. G02F 1/133512 257/59 |

(Continued)

*Primary Examiner* — Kent Chang
*Assistant Examiner* — Benjamin Morales Fernandez
(74) *Attorney, Agent, or Firm* — Cooper Legal Group, LLC (57) ABSTRACT

The present disclosure relates to a touch technology, and more particularly to a touch device and a fabrication method thereof. The touch device comprises a sensing area and a peripheral area. The touch device further comprises a sensing electrode layer, a shading layer, a signal transmission line layer, and a conductive layer. The sensing electrode layer extends from the sensing area to the peripheral area. The shading layer is disposed on the peripheral area to overlay the sensing electrode layer and has a through hole to expose a portion of the sensing electrode layer. The signal transmission line layer is disposed on the shading layer and does not cover the through hole. The conductive layer fills the through hole and electrically connects the sensing electrode layer. In addition, a fabrication, method of a touch device is also provided.

16 Claims, 6 Drawing Sheets

(56) References Cited

U.S. PATENT DOCUMENTS

| | | | |
|---|---|---|---|
| 2011/0242057 A1* | 10/2011 | Lee | G06F 3/041 345/176 |
| 2011/0279405 A1* | 11/2011 | Meng | G06F 3/044 345/174 |
| 2012/0098781 A1* | 4/2012 | Kim | G06F 3/044 345/174 |
| 2012/0113043 A1* | 5/2012 | Liu | G06F 3/044 345/174 |
| 2012/0274602 A1* | 11/2012 | Bita | G02B 26/001 345/174 |
| 2013/0141380 A1* | 6/2013 | Wang | G06F 3/041 345/173 |

* cited by examiner

TOUCH DEVICE AND FABRICATION METHOD THEREOF

CROSS-REFERENCE TO RELATED APPLICATIONS

The current application is a Continuation application of U.S. application Ser. No. 13/450,486, filed on Apr. 19, 2012, which claims the benefit of the People's Republic of China Application No. 201110317586.0, filed on Oct. 13, 2011. The entire contents of the above-referenced applications are incorporated herein by reference.

BACKGROUND OF THE INVENTION

Field of the Invention

The present disclosure relates to a touch technology, and more particularly to a touch device and fabrication method thereof.

Description of the Related Art

In recent years, touch devices have been widely applied in a variety of electronic products such as mobile phones, personal digital assistants (PDA) or pocket personal computers (PC) and the like. Currently, there exist thin and light touch devices, which comprise a protective cover and a touch component that is directly attached onto a side of the protective cover. The side of the protective cover is provided for users to touch for inputting information or controlling the electronic product. Thus, the protective cover provides a protective function and also a new carrying function for the touch component, thereby omitting the touch substrate that was originally used for carrying the touch component. The touch panel has become more and more popular because it is thin and light.

The foregoing thin and light touch device generally comprises a sensing area for users to manipulate, and a peripheral area surrounding the sensing area. A black shading layer is first formed on the peripheral area of a protective cover, a sensing electrode layer is then formed on the sensing area of the protective cover and a part of the peripheral area, and then a signal transmission line layer, electrically connected with the sensing electrode layer, is formed on the black shading layer to transmit electrical signal produced on the sensing electrode layer to an external detecting circuit through the signal transmission line layer. Touch positions are next determined by the external detecting circuit. Due to certain thickness of the black shading layer, the sensing electrode layer disposed on the peripheral area, and the sensing electrode layer disposed on the sensing area have a certain height difference, namely, the sensing electrode layer in the peripheral area is overlaid on the black shading layer as a ladder, resulting in resistance of the sensing electrode layer, which impacts the touch detection precision.

SUMMARY OF THE INVENTION

According to an embodiment of the present disclosure, a signal transmission line layer, which is located on shading layer and sensing electrode layer, is electrically connected by changing the formation order of the sensing electrode layer and the shading layer, and then, a conductive layer is perforated through the shading layer. This overcomes the problem of resistance of the foregoing traditional touch device thereby making the touch device easy to float, and increasing the touch detecting precision.

According to an embodiment of the present disclosure, a touch device has a sensing area and a peripheral area surrounding the sensing area. The touch device comprises: a sensing electrode layer extending from the sensing area to the peripheral area; a first shading layer disposed on the peripheral area and overlaying the sensing electrode layer that is disposed on the peripheral area, wherein the first shading layer has a through hole to expose a part of the sensing electrode layer that is disposed on the peripheral area; a signal transmission line layer disposed on the first shading layer without covering the through hole; and a conductive layer filled in the though hole of the first shading layer until the through hole is overflowing with the conductive layer and is electrically connecting the sensing electrode layer to the signal transmission line layer.

According to the fabrication method of the touch device provided by another embodiment of the present disclosure, the touch device has a sensing area and a peripheral area surrounding the sensing area, the method comprising: forming a sensing electrode layer extending from the sensing area to the peripheral area; forming a first shading layer having a through hole on the peripheral area to overlay the sensing electrode layer that is disposed on the peripheral area and to expose a part of the sensing electrode layer that is disposed on the peripheral area by the through hole; forming a signal transmission line layer without covering the through hole on the first shading layer; and forming a conductive layer by filling the through hole of the first shading layer, thereby electrically connecting the sensing electrode layer to the signal transmission line layer.

The touch device of the present disclosure can avoid the height difference existing between the sensing electrode layer that is disposed on the peripheral area and the sensing electrode layer that is disposed on the sensing area because the shading layer overlays the sensing electrode layer on the peripheral area, and avoids the phenomenon of floating resistance of the sensing electrode layer.

In order to make the foregoing objectives, features and advantages of the present disclosure more comprehensible, several embodiments accompanied with drawings are described in detail below.

DETAILED DESCRIPTION OF THE EMBODIMENTS

In accordance with the usual meaning of "a" and "the" in patents, reference, for example, to "a" through hole or "the" through hole is inclusive of one or more through holes. In this application, use of the singular includes the plural and vice versa unless specifically stated otherwise, for example, a term "sensing electrode" includes singular and plural forms. Section headings used herein are for organizational purposes only, and are not to be construed as limiting the subject matter described.

Detailed description of the present disclosure will be discussed in the following embodiments, which are not intended to limit the scope of the present disclosure, but still can be adapted for other applications. While drawings are illustrated in detail, it would be appreciated that quantity of the disclosed components could be greater or less than disclosed.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Figure 1:
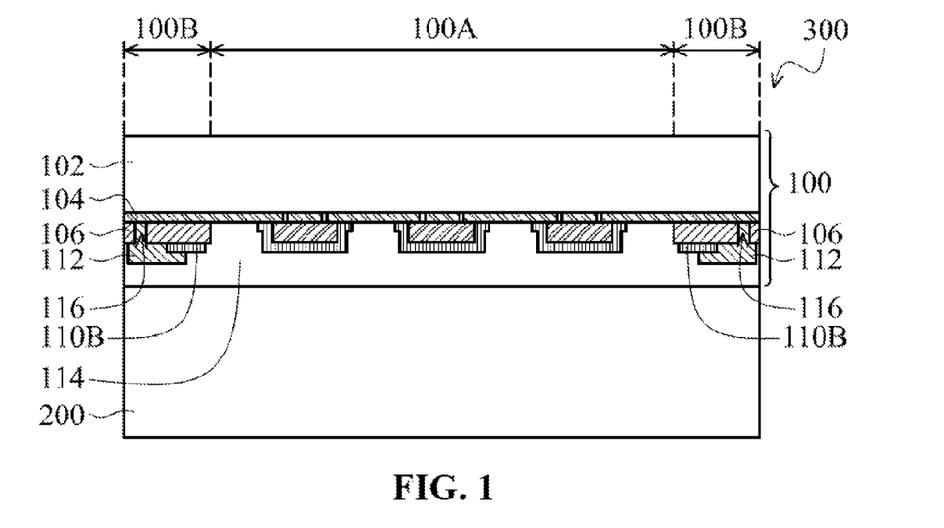
FIG. 1 is a section view diagram of a touch device in accordance with an embodiment of the present disclosure.

FIG. 1 shows a section view diagram of a touch display device 300 in accordance with an embodiment of the present disclosure. The touch display device 300 comprises a touch device 100 and a display panel 200. The display panel 200 comprises a liquid crystal display or any other display component, wherein the display panel 200 may be attached beneath the touch device 100 by an adhesive layer (not shown). The touch device 100 comprises a capacitive touch device having a sensing area 100A and a peripheral area 100B, surrounding the sensing area 100A.

The touch device 100 of the embodiment of the present disclosure has a touch structure (touch-on lens) wherein the touch components are disposed on the protective cover 102. The external surface of the protective cover 102 is a touch surface of the touch device 100, and the material of the protective cover 102 comprises a strengthened glass. A sensing electrode layer 104 is disposed on the internal surface of the protective cover 102 and extends from the sensing area 100A to the peripheral area 100B. Material of the sensing electrode layer 104 can be a transparent conductive material such as indium tin oxide (ITO), and may form a sensing electrode layer 104 either by a depositing process and lithography or an etching process.

A first shading layer 106 is disposed on the peripheral area 100B and overlays the sensing electrode layer 104 on the peripheral area 100B. The material of the first shading layer 106 comprises a black resistance or black printing ink. According to the embodiment of the present disclosure, the first shading layer 106 is formed after the sensing electrode layer 104 has been formed to avoid height difference between the sensing electrode layer 104 on the peripheral area 100B and the sensing electrode layer 104 on the sensing area 100A, making the resistance of the sensing electrode layer 104 stable. Moreover, the depositing process of the sensing electrode layer 104 would not affect the first shading layer 106, namely, gas volatilization of the first shading layer 106 would not occur due to the depositing process of the sensing electrode layer 104. The disposition of the first shading layer 106 would also not increase the resistance of the sensing electrode layer 104 and therefore the touch detection precision of the touch device 100 can be maintained.

Furthermore, the sensing electrode layer 104 is not required to be overlaid on the first shading layer 106, so that the thickness of the first shading layer 106 will adjust according to the shading effect required by the touch device 100, and would not be limited by the ladder overlaying power of the sensing electrode layer 104, such that the display quality of touch display device 300 can be improved.

In the touch device 100 of the embodiment of the present disclosure, the first shading layer 106 has a through hole 116 to expose a portion of the sensing electrode layer 104 that is disposed on the peripheral area 100B. A signal transmission line layer 110B is disposed on the first shading layer 106 and does not cover the through hole 116, and a conductive layer 112 is filled in the through hole 116 of the first shading layer 106, such that the signal transmission line layer 110B is electrically connected with the sensing electrode layer 104 by the conductive layer 112.

In an embodiment, the touch device 100 further comprises a passive protective layer 114 which is wholly overlaid on the sensing electrode layer 104, the first shading layer 106, the signal transmission line layer 110B and the conductive layer 112. In addition, a display panel 200 is provided beneath the touch device 100 to be laminated beneath the passive protective layer 114, so as to form the touch display device 300.

FIG. 2 to FIG. 6 are section view diagrams of the touch device 100 in accordance with embodiments of the present disclosure, wherein the touch device 100 is shown in a manner where protective cover 102 is invertible.

Figure 2:
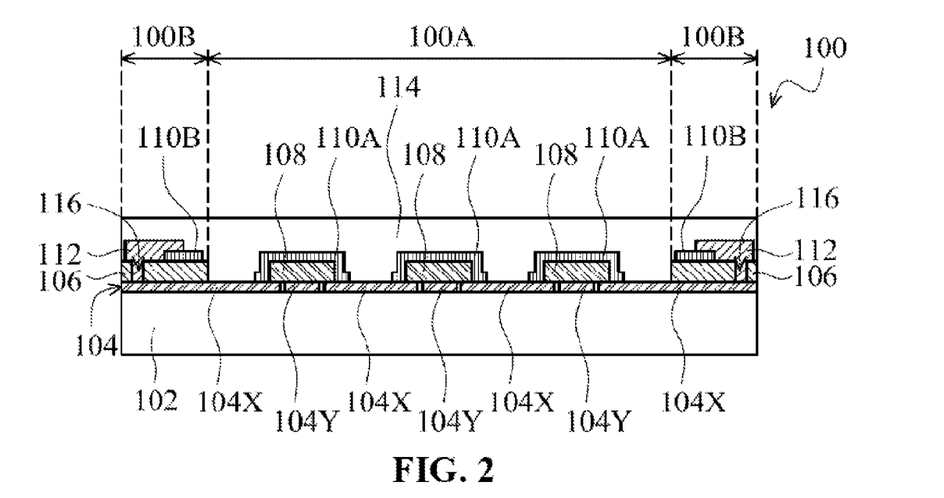
FIG. 2 to FIG. 6 are section view diagrams of the touch device in accordance with each embodiment of the present disclosure.

FIG. 2 shows a section view diagram of the touch device 100 in accordance with an embodiment of the present disclosure. The touch device 100 comprises a protective cover 102, and a sensing electrode layer 104 that is formed on the protective cover 102 and extends from sensing area 100A to peripheral area 100B. The material of the sensing electrode layer 104 is a transparent conductive material, such as indium tin oxide (ITO). In an embodiment, pattern of the sensing electrode layer 104 comprises a plurality of first sensing electrodes 104X which are aligned into columns, and a plurality of second sensing electrodes 104Y which are aligned into rows. In other embodiments, the pattern of the sensing electrode layer 104 can be any other pattern and formed by lithography and etching processes.

In an embodiment, the second sensing electrodes 104Y that are aligned into rows are connected to each other. However, the first sensing electrodes 104X that are aligned into columns are separated from each other. Further, two adjacent first sensing electrodes 104 X in a same column can be electrically connected by a jump wire 110A. The jump wire 110A is made of a metal material. An insulating portion 108 can be disposed between the second sensing electrodes 104Y and the jump wire 110A, such that the first sensing electrodes 104X and the second sensing electrodes 104Y are electrically insulated from each other by the insulating portion 108. The insulating portion 108 is made of a photo-resistant material and is formed by an exposing and developing process.

The first sensing electrodes 104X, aligned into columns, are required to transmit electrical changes induced by the first sensing electrodes 104X to a signal processor (not shown) of the touch display device 300 by a signal transmission line layer 110B to calculate touch signals. The touch signals would be transmitted to the display panel 200 of the touch display device 300 for images shown by the display panel 200. Thus, the signal transmission line layer 110B and the first sensing electrodes 104X are electrically connected. According to an embodiment of the present disclosure, the signal transmission line layer 110B is electrically connected to the first sensing electrodes 104X by the conductive layer 112 that is filled in the through hole 116 of the first shading layer 106 until the conductive layer 112 overflows on the surface of the first shading layer 106. The material of the signal transmission line layer 110B may be a metal. The signal transmission line layer 110B is electrically connected to the jump wire 110A through the conductive layer 112.

In addition, the second sensing electrodes 104Y, which are aligned into rows, also transmit the change in electrical signals by another signal transmission line layer (not shown) which is electrically connected to the second sensing electrodes 104Y by the conductive layer 112 filled in the through hole of the first shading layer 106.

In an embodiment of the present disclosure, the material of the first shading layer 106 comprises black photo-resistant or black printing ink, which may be formed on the peripheral area 100B by coating or printing process. The black photo-resistant is mainly composed of resin, pigment photosensitizer and solvent, and the through hole 116 can be formed by exposing and developing process. The black printing ink is mainly composed of pigment, vehicle and promoter, and the through hole 116 can be formed by the printing process.

In an embodiment, the material of the conductive layer 112 comprises a black conductive adhesive, which is composed of resin, conductive particle and dispersant and may be filled in the through hole 116 by the printing process. The conductive layer 112 overflows on the surface of the first shading layer 106, and the conductive layer 112 further stretches across the surface of the signal transmission line layer 110B for electrical connection. The conductive layer 112 would directly overlay a part of signal transmission line layer 110B to have a contact with the signal transmission line layer 110B. The conductive effect of utilizing the black conductive adhesive to form the conductive layer 112 is excellent, such that the signal transmission line layer 110B and the sensing electrode layer 104 are electrically connected without affecting the function of the touch device 100.

The passive protective layer 114 is wholly formed to overlay the sensing electrode layer 104, the jump wire 110A, the first shading layer 106, the signal transmission line layer 110B, and the conductive layer 112. Material of the passive protective layer 114 is photo-resistant.

Figure 3:
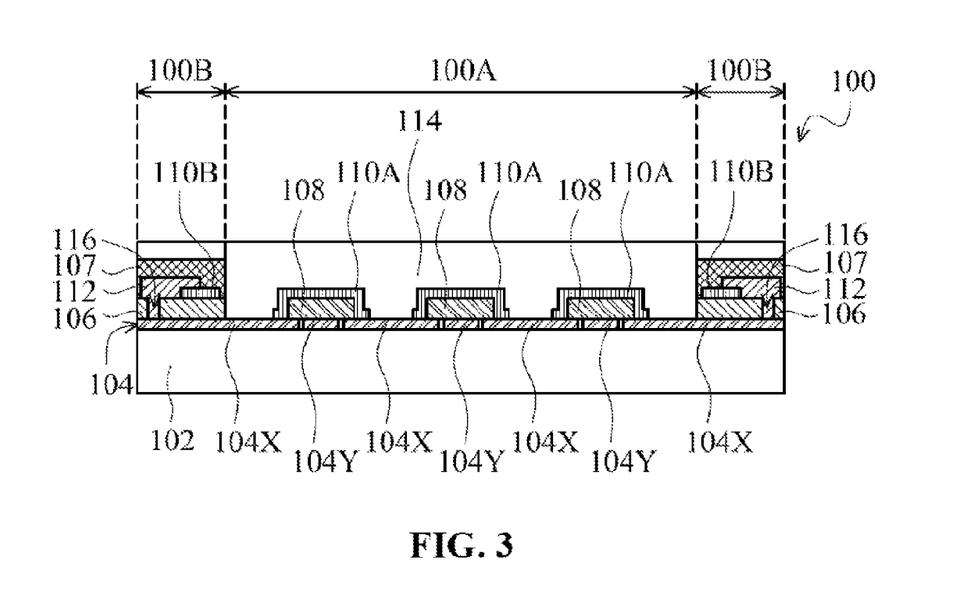

FIG. 3 shows a section view diagram of the touch device 100 in accordance with another embodiment of the present disclosure. The difference between the touch device 100 of FIG. 3 and the touch device 100 of FIG. 2 is that the touch device 100 of FIG. 3 further comprises a second shading layer 107. The second shading layer 107 is disposed on the peripheral area 100B and is directly overlaid on the signal transmission line layer 110B and the conductive layer 112. The material of the second shading layer 107 comprises a black printing ink. The second shading layer 107 may first be formed by printing process and then the passive protective layer 114 can be formed to overlay the second shading layer 107, the sensing electrode layer 104, and the jump wire 110A. In this embodiment, since the second shading layer 107 overlays the signal transmission line layer 110B, shading effect of the peripheral area 100B is better, and display quality of the touch display device 300 is further improved.

Figure 4:
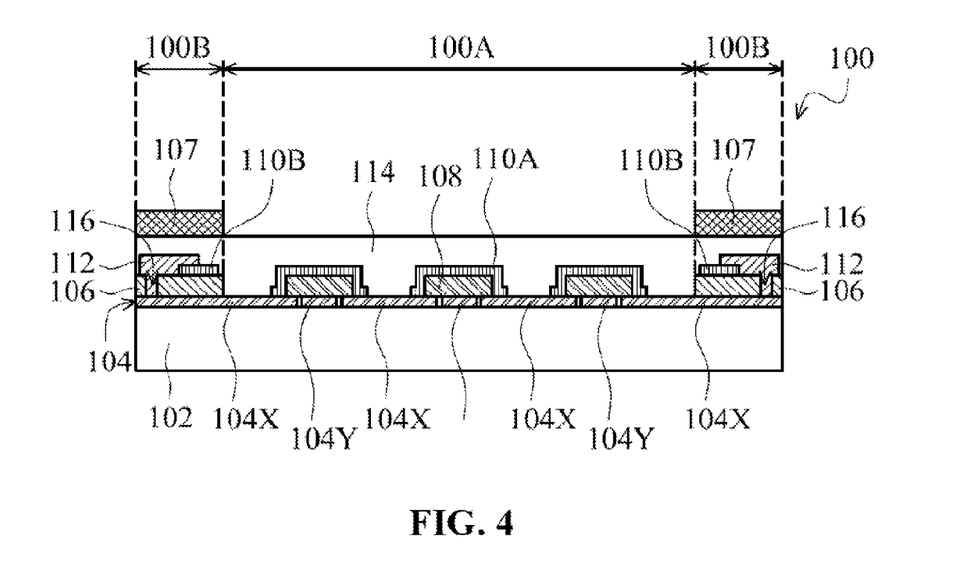

FIG. 4 shows a section view diagram of the touch device 100 in accordance with another embodiment of the present disclosure. The difference between the touch device 100 of FIG. 4 and the touch device 100 of FIG. 3 is that the second shading layer 107 of the touch device 100 of FIG. 4 is disposed on the passive protective layer 114. Material of the second shading layer 107 comprises black printing ink, and the second shading layer 107 may be formed by the printing process on the passive protective layer 114 of the peripheral area 100B after the passive protective layer 114 has been formed. In this embodiment, since the second shading layer 107 overlays the signal transmission line layer 110B, the shading effect of the peripheral area 100B is enhanced, and the display quality of the touch display device 300 is improved.

Figure 5:
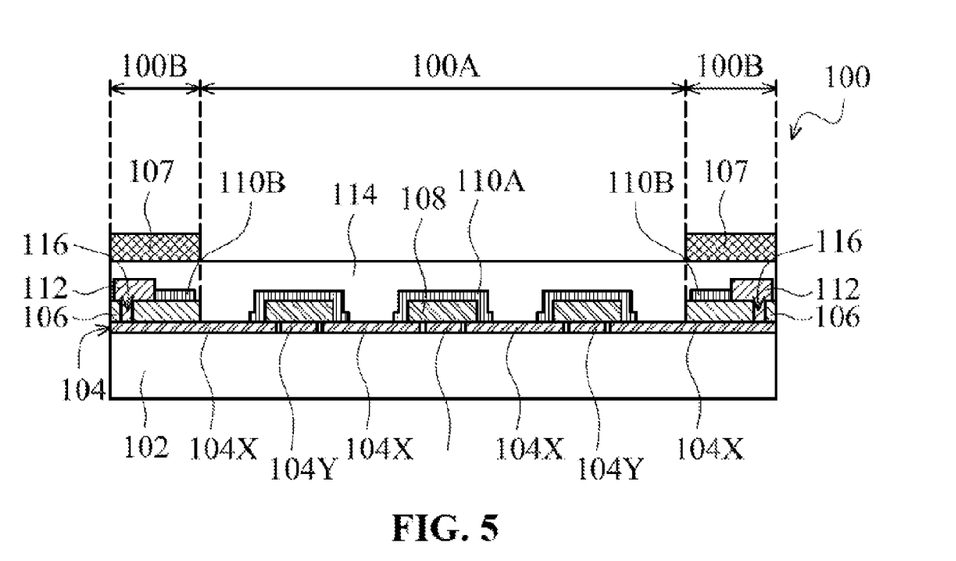

FIG. 5 shows a section view diagram of the touch device 100 in accordance with another embodiment of the present disclosure. The difference between the touch device 100 of FIG. 5 and the touch device 100 of FIG. 4 is that a side face of the conductive layer 112 and a side face of the signal transmission line layer 110B of the touch device 100 of FIG. 5 are electrically connected and the thickness of the overflow part of the conductive layer 112 is greater than the thickness of the signal transmission line layer 110B.

Figure 6:
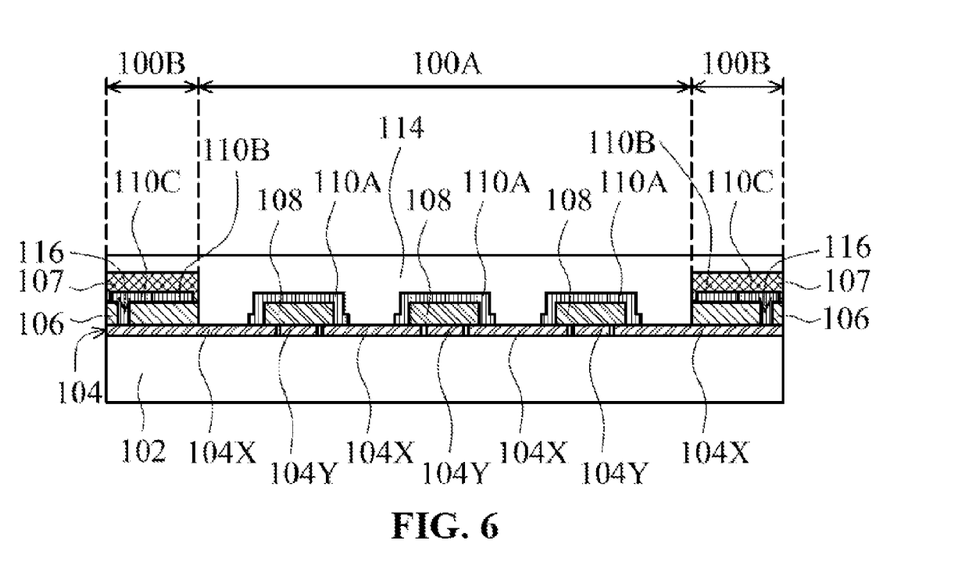

FIG. 6 shows a section view diagram of the touch device 100 in accordance with another embodiment of the present disclosure. The difference between the touch device 100 of FIG. 6 and the touch device 100 of FIG. 3 is that the material of the conductive layer 110C and the material of the signal transmission line layer 110B of the touch device 100 of FIG. 6 are same, such as a metal or any conductive material. The conductive material used for forming the signal transmission line layer 110B is filled in the through hole 116 of the first shading layer 106 simultaneously during the process of forming the signal transmission line layer 110B to form the conductive layer 110C. The conductive layer 110C overflows on the surface of the first shading layer 106, wherein a side face of the conductive layer 110C is in contact with a side face of the signal transmission line layer 110B for electrical connectivity. The thickness of the overflow part of the conductive layer 110C is equal to the thickness of the signal transmission line layer 110B.

In an embodiment of the present disclosure, the conductive layer 110C, the signal transmission line layer 110B, and the jump wire 110A may be completed simultaneously by the same process. The conductive effect of the conductive layer 110C, formed by the conductive materials of the signal transmission line layer 110B, is better such that the signal transmission line layer 110B is more efficiently electrically connected with the sensing electrode layer 104 without affecting the function of the touch device 100. In addition, the second shading layer 107, which is overlaid on the signal transmission line layer 110 B and the conductive layer 110C, may make the peripheral area 100B opaque, thereby improving the display quality of the touch display device 300.

Figure 7A:
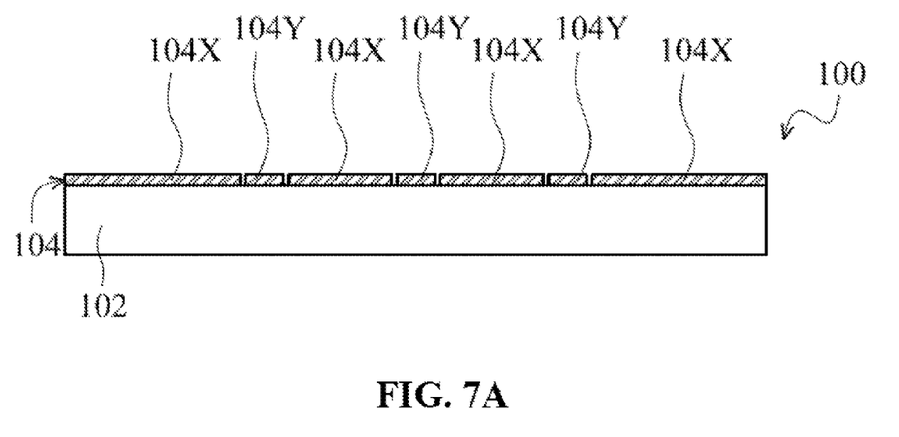
FIG. 7A to FIG. 7E are section view diagrams of intermediate phases of fabricating the touch device of FIG. 2 in accordance with an embodiment of the present disclosure.

FIG. 7A to FIG. 7E show section view diagrams of intermediate phases of fabricating the touch device 100 of FIG. 2 in accordance with an embodiment of the present disclosure. Firstly, as shown in FIG. 7A, a protective cover 102, and a transparent conductive material layer are wholly deposited on the internal surface of the protective cover 102, wherein the depositing process is a sputtering process. Next the transparent conductive material layer is patterned by lithography and etching process to form a sensing electrode layer 104, which extends from the sensing area 100A to the peripheral area 100B. The sensing electrode layer 104 comprises a plurality of first sensing electrodes 104X which are aligned into columns, and a plurality of second sensing electrodes 104Y which are aligned into rows.

Figure 7B:
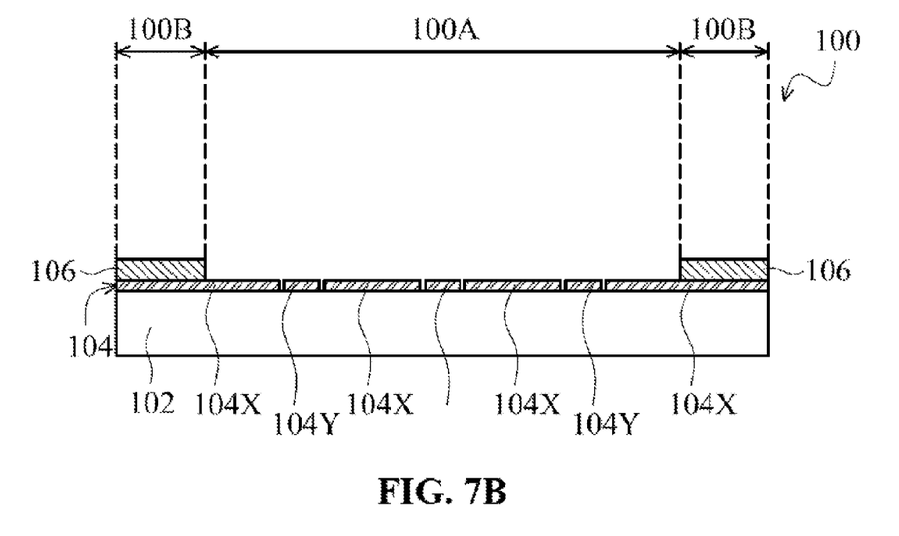

FIG. 7B shows a first shading layer 106 that is formed on the sensing electrode layer 104 of the peripheral area 100B, and the material comprises black photo-resistant or black printing ink, which may be patterned by lithography and etching process to form a first shading layer 106.

Figure 7C:
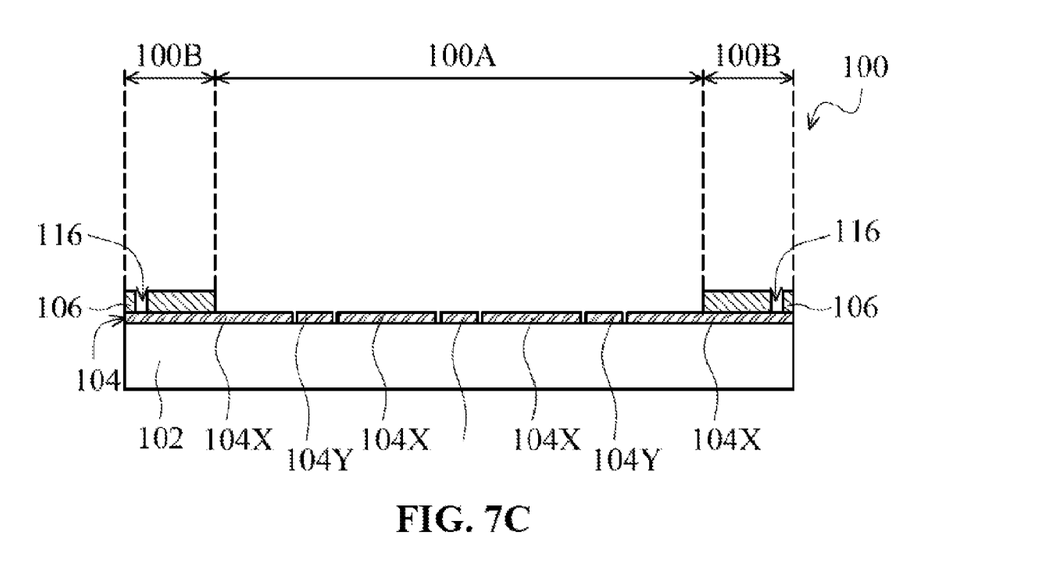

FIG. 7C shows formation of a through hole 116 in the first shading layer 106 to expose a portion of the sensing electrode layer 104, by lithography or printing process. When the material of the first shading layer 106 is black printing ink, patterning of the first shading layer 106 and formation of the through hole 116 may be completed simultaneously by the printing process.

Figure 7D:
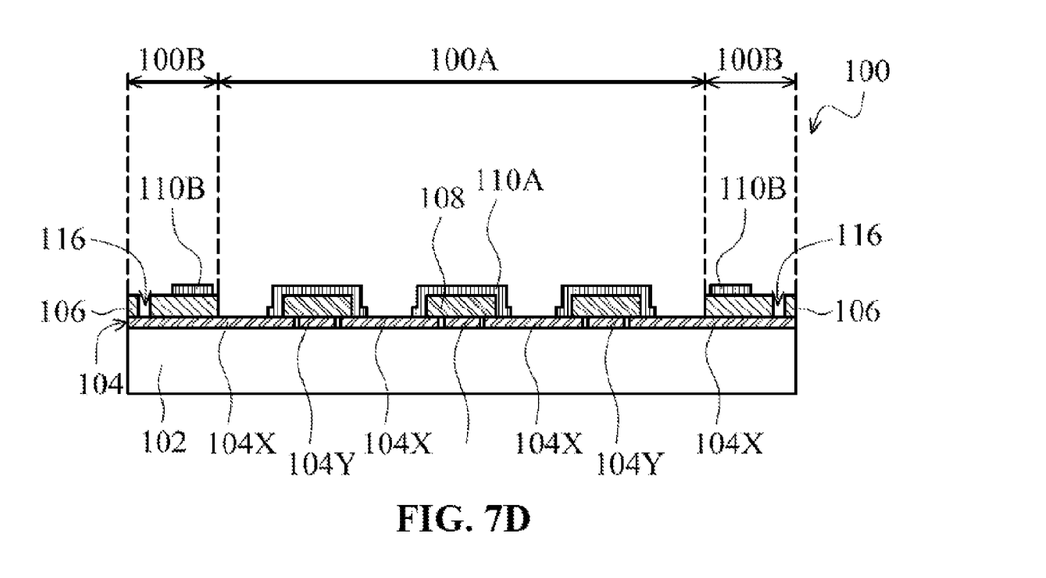

FIG. 7D shows the formation of an insulation part 108 on the second sensing electrodes 104Y of the sensing electrode layer 104, wherein the material may be organic or inorganic insulating materials, such as polyimide. The insulating materials may be patterned by lithography and etching process to form the insulating part 108. Then, a jump wire 110A is formed on the insulation part 108, and the signal transmission line layer 110B is formed on the first shading layer 106. The jump wire 110A and the signal transmission line layer 110B are both made of metal materials, which may either be patterned by the lithography and etching process or printing process to form the jump wire 110A and the signal transmission line layer 110B. In an embodiment, the jump wire 110A and the signal transmission line layer 110B can be formed simultaneously by the same process.

According to an embodiment of the touch device 100 of FIG. 6, as shown in FIG. 7D, the conductive layer 110C is formed simultaneously with the process of forming the jump wire 110A and the signal transmission line layer 110B, wherein the conductive layer 110C is filled in the through hole 116 and overflows the surface of the first shading layer 106. The jump wire 110A, the signal transmission line layer 110B, and the conductive layer 110C are all made of metal material, which can all be patterned by lithography and etching process or by printing process, In an embodiment, the jump wire 110A, the signal transmission line layer 110B, and the conductive layer 110C can be formed simultaneously by the same process.

Figure 7E:
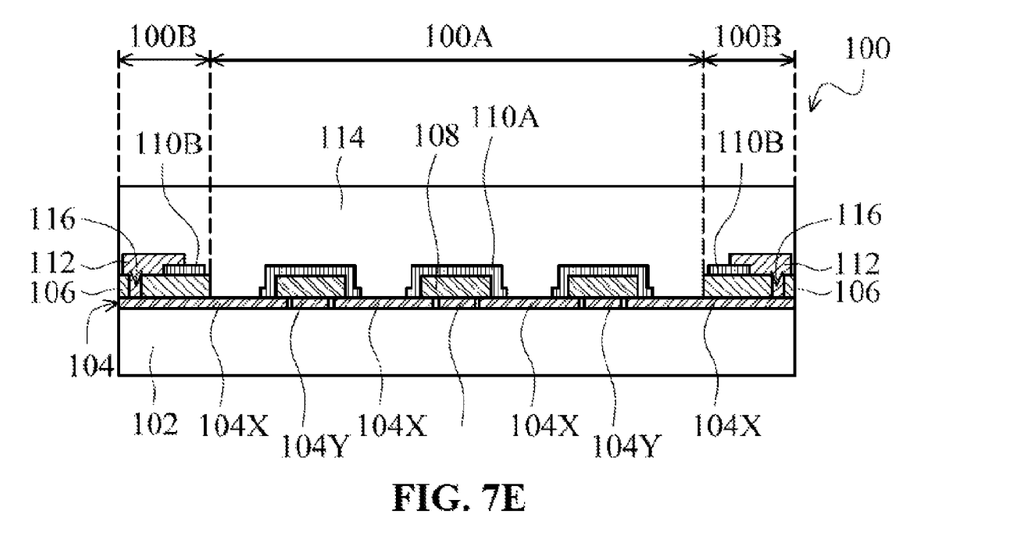

FIG. 7E shows the filling of the conductive layer 112 in the through hole 116 of the first shading layer 106 until the conductive layer 112 overflows on the surface of the first shading layer 106. A part of the conductive layer 112 stretches across the surface of the signal transmission line layer 110B for electrical connection, and the overflow part of the conductive layer 112 would directly overlay a part of the signal transmission line layer 110B to have a contact with the signal transmission line layer 110B. The material of the conductive layer 112 comprises black conductive adhesive, wherein the conductive layer 112 can be formed by the printing process. Then, the passive protective layer 114 can be formed to wholly overlay all the components on the protective cover 102, including the sensing electrode layer 104, jump wire 110A, the signal transmission line layer 110B, the conductive layer 112, the first shading layer 106, and the like, so as to complete the fabrication of the touch device 100 of FIG. 2.

According to an embodiment of the present disclosure, the sensing electrode layer is first formed on the protective cover 102 of the touch device 100 and extends from the sensing area 100A to the peripheral area 100B, wherein the first shading layer 106 is then formed on the sensing electrode layer 104 of the peripheral area 100B. Thus, compared with traditional manufacturing process of a touch device, the height difference that existed between the sensing electrode layer 104 located on the peripheral area 100B, and the sensing electrode layer 104 located on the sensing area 100A is avoided, and the value of resistance of the sensing electrode layer 104 would not float. The depositing process of the sensing electrode layer 104 in accordance with the embodiment of the present disclosure would not affect the first shading layer 106, such that gas volatilization of the first shading layer 106 would not occur during the depositing process of the sensing electrode layer, thereby improving touch sensitivity of the touch device 100. In addition, compared with the traditional manufacturing process of the touch device, thickness of the first shading layer in accordance with an embodiment of the present disclosure can be adjusted to reach better shading effect to meet demands of the touch display device 300, not limited by the ladder overlaying power of the sensing electrode layer 104, thereby improving the display quality of the touch display device 300.

Furthermore, according to an embodiment of the present disclosure, the through hole 116 is formed in the first shading layer 106 to expose a part of the sensing electrode layer 104. Next the through hole 116 is filled with the conductive layer 112 or 110C, which overflows on the surface of the first shading layer 106 and directly contacts with the signal transmission line layer 110B. Conductive effect of the conductive layer 112 or 110C is excellent, allowing the layer to electrically connect the signal transmission line layer 110B and the sensing electrode layer 104 without affecting the function of the touch device 100.

In addition, in the touch device 100, according to an embodiment of the present disclosure, a second shading layer 107 may be additionally formed on the peripheral area 100B, above the signal transmission line layer 110B and the conductive layers 112 or 110C. The second shading layer 107 enhances the shading effect of the peripheral area 100B, thereby improving the display quality of the touch display device 300.

Although the present disclosure refers to above described embodiments, it is not intended to limit the scope of the disclosure. It is apparent to those skilled in the art that modifications and substitutions to the described embodiments may be made without departing from the spirit and scope of the present disclosure. Accordingly, the scope of the present disclosure is further defined by the attached claims.

What is claimed is:

1. A fabrication method of a touch device, wherein the touch device has a sensing area and a peripheral area surrounding the sensing area, the method comprising:
   forming a sensing electrode layer extending from the sensing area to the peripheral area;
   forming a first shading layer having a through hole on the peripheral area to overlay the sensing electrode layer disposed on the peripheral area and to expose a part of the sensing electrode layer disposed on the peripheral area by the through hole;
   forming a signal transmission line layer without covering the through hole on the first shading layer; and
   forming a conductive layer to fill in the through hole of the first shading layer and to electrically connect the sensing electrode layer and the signal transmission line layer, wherein the conductive layer overflows a surface of the first shading layer, and wherein the overflow part of the conductive layer stretches across a surface of the signal transmission line layer for electrical connection.

2. The fabrication method of the touch device of claim 1, wherein a side face of the overflow part of the conductive layer and a side face of the signal transmission line layer are in contact with each other for electrical connection.

3. The fabrication method of the touch device of claim 1, wherein a thickness of the overflow part of the conductive layer is greater than or equal to a thickness of the signal transmission line layer.

4. The fabrication method of the touch device of claim 1, wherein a part of the overflow part of the conductive layer directly overlays a part of the signal transmission line layer to have a contact with the signal transmission line layer.

5. The fabrication method of the touch device of claim 1, wherein the step of forming the first shading layer having the through hole comprises an exposing and developing process or a printing process.

6. The fabrication method of the touch device of claim 1, wherein the step of forming the sensing electrode layer comprises forming the sensing electrode layer on a protective layer, wherein the sensing electrode layer is positioned between the protective layer and the first shading layer, and wherein the method further comprises:
   forming a passive protective layer to wholly overlay the sensing electrode layer, the first shading layer, the signal transmission line layer, and the conductive layer; and
   forming a second shading layer above the signal transmission line layer and the conductive layer.

7. The fabrication method of the touch device of claim 6, wherein the second shading layer is formed before or after the step of forming the passive protective layer.

8. The fabrication method of the touch device of claim 6, wherein material of the second shading layer comprises black printing ink, and wherein the step of forming the second shading layer further comprises a printing process.

9. The fabrication method of the touch device of claim 1, wherein material of the conductive layer comprises black conductive adhesive or metal material.

10. A touch device comprising a sensing area and a peripheral area surrounding the sensing area, the touch device further comprising:
    a sensing electrode layer extending from the sensing area to the peripheral area;
    a first shading layer disposed on the peripheral area and overlaying the sensing electrode layer disposed on the peripheral area, wherein the first shading layer has a through hole to expose a part of the sensing electrode layer disposed on the peripheral area;
    a signal transmission line layer disposed on the first shading layer without covering the through hole; and
    a conductive layer filled in the through hole of the first shading layer until conductive material overflows therefrom, wherein the conductive layer is electrically connected to the sensing electrode layer and the signal transmission line layer, wherein the conductive layer overflows a surface of the first shading layer, and wherein the overflow part of the conductive layer stretches across a surface of the signal transmission line layer for electrical connection.

11. The touch device of claim 10, wherein a part of the overflow part of the conductive layer directly overlays a part of the signal transmission line layer to have contact with the signal transmission line layer.

12. The touch device of claim 10, wherein material of the conductive layer comprises black conductive adhesive or metal material.

13. The touch device of claim 10, wherein a thickness of the overflow part of the conductive layer is greater than or equal to a thickness of the signal transmission line layer.

14. The touch device of claim 10, further comprising:
    a protective layer, wherein the sensing electrode layer is disposed on the protective layer and positioned between the protective layer and the first shading layer;
    a passive protective layer that wholly overlays the sensing electrode layer, the first shading layer, the signal transmission line layer, and the conductive layer; and
    a second shading layer disposed above the signal transmission line layer and the conductive layer.

15. The touch device of claim 14, wherein the second shading layer is disposed beneath or on the passive protective layer.

16. The touch device of claim 15, wherein material of the first shading layer comprises black photo-resistant or black printing ink, and material of the second shading layer comprises black printing ink.

* * * * *